March 17, 1964 E. L. EGBERT 3,124,973
HYDRODYNAMIC TORQUE TRANSMITTING DEVICE
Filed May 29, 1961

INVENTOR.
Earl L. Egbert
BY
Hugh L. Fisher
ATTORNEY

United States Patent Office 3,124,973
Patented Mar. 17, 1964

3,124,973
HYDRODYNAMIC TORQUE TRANSMITTING
DEVICE
Earl L. Egbert, Northville, Mich., assignor to General Motors Corporation, Detroit, Mich., a corporation of Delaware
Filed May 29, 1961, Ser. No. 113,537
3 Claims. (Cl. 74—731)

This invention relates generally to hydrodynamic torque transmitting devices and more particularly to the controls therefor.

Hydrodynamic torque transmitting devices such as fluid couplings have advantages when used to change ratios in a vehicle transmission. The most significant of these advantages is the fluid coupling's ability to produce smooth ratio changes and also when in operation a fluid coupling effectively absorbs drive line shocks.

When used as a shifting clutch in a vehicle transmission, a fluid coupling must be activated and deactivated within certain time intervals in order to prevent either excessive engine speed-up or retardation. For example, if a fluid coupling is combined with a planetary gearset to produce either an underdrive when empty or a direct drive when filled and it is desired to produce a ratio change such that the coupling must be drained, it can be appreciated that if the fluid coupling is drained too quickly there can possibly be an interruption of the connection between the engine and the wheels with this resultant engine speed flare-up. On the other hand, if the coupling is not drained fast enough, there can be an overlap such that the engine is retarded very severely or even stalled.

Attempts have been made to solve this problem by the use of an exhaust valve of a character that drains the coupling in a certain time interval. However, such a valve does not comprehend different conditions such as instances when quick drainage is needed and other times when the drainage should be slower. Accordingly, the invention contemplates controlling the operation of a hydrodynamic torque transmitting device by a novel arrangement that facilitates optimum operation under all conditions.

More specifically, the invention seeks to provide a hydrodynamic torque transmitting device that facilitates with a unique control the emptying and filling of the device at optimum rates determined by existing conditions so as to enable gear ratio changes to be more effectively achieved.

Another more detailed aim of the invention is to provide for the emptying of a fluid coupling at different rates determined by the speed of one of the coupling rotors. Additionally, the invention enables the rate of drainage of a fluid coupling to be correlated with the speed of one of the coupling rotors.

The foregoing and other objects and advantages of the invention will be apparent from the following description and from the accompanying drawings in which.

Figure 1:
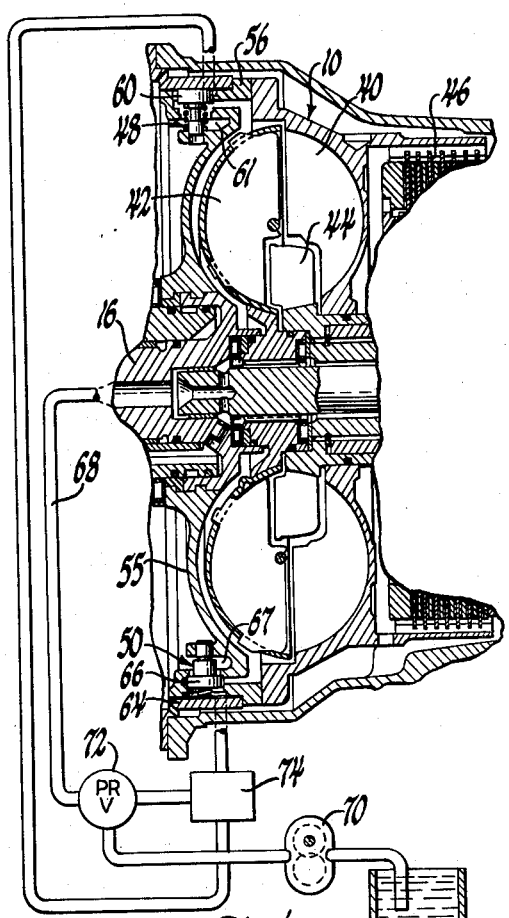
FIGURE 1 is a sectional view of a hydrodynamic torque transmitting device incorporating the principles of the invention.
Figure 2:
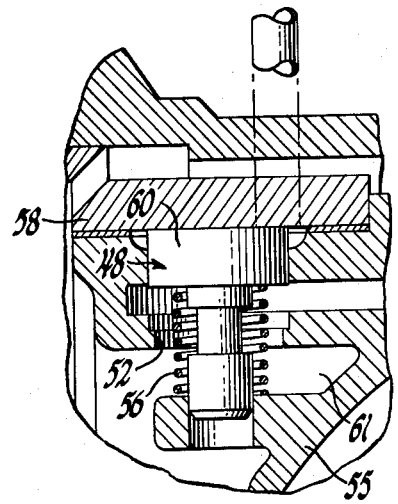
FIGURE 2 is an enlarged view of a low speed exhaust valve for the device.
Figure 3:
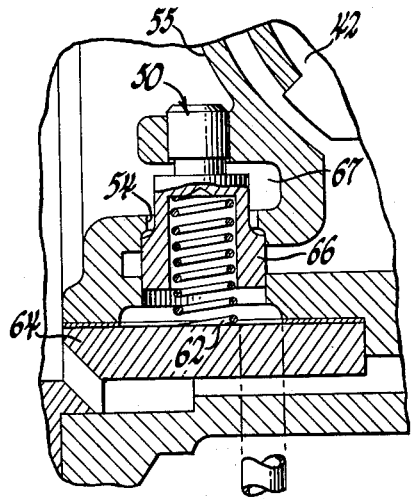
FIGURE 3 is an enlarged view of a high speed exhaust valve for the device.
Figure 4:
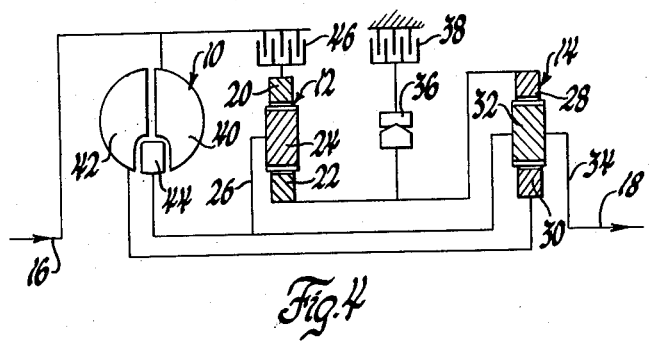
FIGURE 4 is a schematic view of a transmission utilizing the device.

Referring now to the drawings in detail and particularly to FIGURE 4, the transmission shown is fully described in a U.S. application Serial No. 57,189 to Borman, Jr. et al., filed September 20, 1960, and entitled Transmission. The description of this transmission, therefore, will only be sufficiently detailed to promote a better understanding and appreciation of the problems presented by emptying and the filling of a hydrodynamic torque transmitting device, such as a fluid coupling 10 when incorporated in a vehicle transmission. In addition to the coupling 10, the transmission includes a front planetary gear unit 12 and a rear planetary gear unit 14. These two gear units 12 and 14 and the fluid coupling 10 are interposed between an engine driven input shaft 16 and a vehicle wheel connected output shaft 18 and combine to provide three forward drive ratios as will become apparent.

Considering first the gearing, the front planetary gear unit 12 has a ring gear 20 and a sun gear 22, each intermeshing with one or more planet pinions 24 in turn journaled on an output planet carrier 26. Similarly, the rear planetary gear unit 14 includes a ring gear 28 and a sun gear 30, and these gears 28 and 30 too intermesh with one or more planet pinions 32. The planet pinions 32 are revolvably mounted on an output planet carrier 34 that interconnects the front gear unit carrier 26 and the output shaft 18. The front gear unit sun gear 22 and the rear gear unit ring gear 28 serve as reaction gears respectively for the gear units 12 and 14, and are each restrained from reverse rotation by the combination of a one-way device 36 and a forward brake 38. The one-way device 36 may be of known construction employing sprags, rollers, or the equivalent for preventing relative rotation between two members in one direction.

The fluid coupling comprises an impeller 40 drive connected to the input shaft 16 and first and second turbines 42 and 44 respectively joined to the rear gear unit sun gear 30 and the front gear unit planet carrier 26. The impeller 40 and the turbines 42 and 44 have suitable blade structure and coact in a known way to transmit drive through the fluid medium.

In describing the operation of the FIGURE 4 transmission, it will first be assumed the the vehicle is to be started in the first drive ratio or that ratio affording the maximum torque. In this ratio, the fluid coupling 10 is filled with fluid and the forward brake 38 is engaged in some appropriate way. Consequently, drive is only transferred to the rear gear unit sun gear 30. Since the rear gear unit reaction ring gear 28 cannot revolve backwards, the output planet carrier 34 and accordingly the output shaft 18 will be caused to revolve at a reduced speed.

It should be noted that initially the output shaft 18 is stationary and since the second turbine 44 is connected by both the front and rear gear unit planet carriers 26 and 34 to the output shaft 18, initial rotation of the second turbine 44 will be resisted. This feature will provide an increased starting torque somewhat in the manner of a torque converter stator with the result that the output from the coupling 10 is multiplied to an extent determined in part by the construction of the second turbine 44. In this manner the starting ratio obtained from the rear gear unit 14 is supplemented. After the output shaft 18 commences to revolve, the influence of the second turbine 44 on the over-all ratio will gradually dissipate.

To establish the second drive ratio, a second speed clutch 46 interposed between the fluid coupling impeller 40 and the front gear unit ring gear 20 is engaged and the coupling 10 is drained. The front gear unit 12 now becomes effective to produce a reduced drive since the sun gear 22 will be prevented from revolving backwards by the action of the one-way device 36 and the forward brake 38. Hence, the output carrier 26 will revolve the output shaft 18 through the intermediary of the rear gear unit carrier 34 at a slightly faster speed than in the first drive ratio. Meanwhile, the rear gear unit 14 is ineffective since the coupling 10 is drained.

The third drive ratio is produced by again filling the coupling 10 so that a substantially direct drive through the transmission is achieved. This is because the drive to the front gear unit ring gear 20 and that via the coupling 10 to the rear gear unit sun gear 30 is at approximately the same speed as the input shaft 16, there being a slight difference due to slippage through the fluid coupling 10. With both the front and rear gear units 12 and 14 being driven at the same speeds, the gearing will become, for all practical purposes, locked up.

The need to drain the coupling 10 at a proper rate now becomes more apparent for if during a first to second shift the coupling 10 is drained before the second speed clutch 46 is completely engaged, an excessive engine speed-up can result due to the temporary interruption of the connection between the wheels and the engine. On the other hand, if the coupling 10 drains too slowly and still has capacity at the time the second speed clutch 46 becomes fully engaged, a third speed condition can exist momentarily. Of course, the engine torque available is adequate with second speed torque multiplication but is not sufficient to overcome the road load with a third speed direct drive. As a result, the engine will be excessively retarded and in some instances it may be stalled.

Also, when downshifting from third to second, the coupling 10 must be drained while the second speed clutch 46 remains engaged and the one-way device 36 again becomes effective along with the forward brake 38 to resist reverse rotation of the front gear unit sun gear 22. Since only the one-way device 36 and the coupling 10 are involved in a third to second downshift, it can be appreciated that the assumption of the reaction load by the one-way device 36 will be influenced by the rate at which the coupling 10 is drained. In other words, as the coupling capacity diminishes, the one-way device capacity increases; hence, proper coordination facilitates the achievement of a smooth transition, keeping in mind that the coupling fluid inherently absorbs drive line shocks.

If the third to second downshift occurs at a relatively low impeller speed and the coupling 10 is drained too rapidly, a very discernible and objectionable jar will result because the one-way device 36 will abruptly stop the front unit sun gear 22 from rotating. But, if the impeller speed is high, as when a full throttle forced downshift is made, the coupling 10 should be drained quickly so that the shift can be completed in a minimum of time and permit the wanted rapid vehicle acceleration.

For these reasons, the coupling 10 employs a low speed exhaust valve 48 and a high speed exhaust valve 50. The number of each of these valves, of course, will be determined by the rate at which the coupling 10 must be drained and the dynamic balance requirements. The valves 48 and 50 are installed, respectively, in radially extending bores 52 and 54 in the outer periphery of a housing 55. The housing 55 interconnects the input shaft 16 and the impeller 40 and additionally serves as a partial enclosure for the coupling 10.

The low speed exhaust valve 48 is urged to the illustrated position by a spring 56 so as to abut an arcuate plate 58 covering the end of the bore 52. Also, urging the low speed exhaust valve 48 to the open position is centrifugal force, the amount of which would be influenced by the size of the valve 48 as well as other factors such as the rotational speed and the radial distance of the valve 48 from the axis of rotation. In this embodiment, the valve 48 is provided with a relatively large head 60 to increase the centrifugal effect. When in the open position, communication is established by the valve 48 with the interior of the coupling 10 via the bore 52 and an exhaust passage 61, such that the coupling 10 will commence to drain.

The high speed exhaust valve 50 is urged to the closed position by a spring 62 interposed between an arcuate plate 64 for closing the end of the bore 54 and the valve 50. Valve 50 also has an enlarged head 66 for producing a certain centrifugal effect and when in the open position connects the coupling interior with an exhaust passage 67.

Pressure fluid is supplied to an inlet 68 to the coupling 10 by a suitable pump 70 at a pressure determined by an appropriate pressure regulating valve 72. Pressure fluid is also supplied to the upper ends of the low and high speed exhaust valves 48 and 50 so as to insure that these valves 48 and 50 are maintained in their respective closed positions until it is desired to drain the coupling 10. This may be accomplished by a suitable timing valve as that generally denoted by the numeral 74 and described in the aforementioned application Serial No. 57,189.

With this control system, at the time a first to second speed shift is to take place, the pressure supplied to the upper ends of the valves 48 and 50 will be relieved by the timing valve 74 whereupon the low speed exhaust valve 48 will quickly move to the exhaust position, this being due to the opposing forces derived from the centrifugal effects on the valve 48 from the valve 48 itself and from the fluid remaining at the upper end of the valve 48 due to the residual effect and the bias from spring 56, which can represent the net force tending to move the valve 48 to the exhaust position. The slow rate of coupling exhaust will now be established. At this instant, the high speed exhaust valve 50 may either remain in the closed position or open depending on the impeller speed at which the valve 50 is supposed to open. Necessarily for the valve 50 to open, the bias from the spring 62 must be overcome by the centrifugal effect acting on the valve 50. With both the valves 48 and 50 in their open positions, the fast rate of coupling exhaust will become effective.

In between these slow and fast rates, the exhaust valve 50 can be caused to alter the over-all exhaust rate to conform to changes in the speed of the impeller 40. In other words, if wanted, the exhaust rate can be made truly speed responsive. Or, if not wanted, the exhaust valve 50 can be caused to move quickly to the open position at a certain impeller speed so as to avoid this speed responsiveness. Which arrangement is selected will be determined by the use of the coupling 10 and can be obtained in a well known way by correlating the valve areas with the pressures. Whether the high speed exhaust valve 50 opens at substantially the same time as the low speed exhaust valve 48 or later will be determined by the speed at which the impeller 40 is being rotated when the pressure fluid at the upper ends of valves 48 and 50 is relieved by the timing valve 74. For example, if the engine speed is being increased rapidly as during a full throttle first to second shift, it will be preferred to have both valves 48 and 50 open quickly. Hence, the high speed exhaust valve 50 will open at substantially the same time as the low speed exhaust valve 48.

On the other hand, if the first to second shift is to occur at a relatively light throttle opening, the high speed exhaust valve 50 should not open as soon but should remain closed until a slightly higher impeller speed is attained determined by the overlap desired. This insures that the coupling 10 is not drained prior to the conditioning of the second speed clutch 46 for assuming its proportion of the torque to be transmitted.

Therefore, when a shift from first to second occurs at relatively slow speeds, the coupling 10 will drain at a slower rate and thereby insure that the overlap of the functions of the coupling 10 and the second speed clutch 46 are adequate to prevent any excessive engine flare-up. When the same shift occurs at a higher speed, the coupling 10 is drained quickly to prevent the possibility of third speed being established momentarily such that the engine then would be retarded excessively. In between these two extremes the coupling 10 will be exhausted at a rate determined by impeller speed. This enables the fluid coupling 10 to be utilized very effectively as a shifting clutch and without resort to any complex control system since the valving senses the actual speed of one of the coupling members.

By having the valves 48 and 50 available if a third to second speed downshift is to take place at a relatively low impeller speed, only the low speed exhaust valve 48 will open and the coupling 10 will drain at a slower rate. Therefore, the one-way device 36 will not lock as quickly and the objectionable jar will be avoided. Also, if the impeller speed is high, both of the valves 48 and 50 will open and the coupling 10 will desirably be emptied rapidly.

The invention is to be limited only by the following claims:

1. In a hydrodynamic torque transmitting device, the combination of a rotatable casing, a source of fluid for the device, differently calibrated exhaust valves revolvable with the casing for controlling the discharge of fluid from the device, a control for applying means holding the exhaust valves closed so as to prevent discharge of fluid from the device, and for rendering the holding means ineffective, one of the said valves being operable when the holding means is ineffective to cause fluid to be discharged from the device at one rate, another of the said valves being operable in response to centrifugal force and when the holding means is inoperative to also cause fluid to be discharged from the device when the casing attains a certain speed and thereby increase the rate of discharge.

2. In a fluid coupling, the combination of a pump and a turbine, a valve housing revolvable with the pump, a pair of exhaust bores in the periphery of the housing and extending to the exterior of the coupling, a source of fluid for the coupling, exhaust valves slidable in each of the bores between open and closed positions so as to control the discharge of fluid from the coupling, bias means urging one of the valves to the open position, biasing means urging the other of the valves to the closed position, a source of holding pressure, means for supplying said holding pressure to said valves for maintaining each of the valves in the closed position, and for interrupting the supply of holding pressure to the valves, the one of the valves being so arranged as to be opened by the biasing means acting thereon when the holding pressure is removed to establish one rate of discharge, the other of the valves being responsive to centrifugal force so that when the pump attains a certain speed the centrifugal force developed will cause the other of the valves to overcome the biasing means and move to the open position thereof to thereby increase the rate of drainage of fluid from the coupling.

3. In a transmission, the combination of gearing and ratio changing means conditioning the gearing for different drive ratios, the ratio changing means including a fluid coupling operative when discharged of fluid to cause a change from one ratio to another, the fluid coupling having a pair of rotors and means controlling the discharge of fluid therefrom, the controlling means comprising a valve housing revolvable with one of the rotors and including a pair of exhaust passages extending to the exterior of the coupling, valve bores intersecting the exhaust passages, exhaust valves slidable in each valve bore to control the discharge of fluid from the coupling via the exhaust passages, a source of holding pressure, means for supplying said holding pressure to said valves for maintaining the valves closed, and for interrupting the supply of holding pressure to the valves upon initiation of a ratio change, said valves being so differently calibrated that one of the valves opens when the supply of holding pressure is interrupted so as to commence the discharge of fluid from the device at one rate, the other of the valves being responsive to centrifugal force and arranged to open when the valve housing attains a certain speed so as to increase the discharge rate.

References Cited in the file of this patent

UNITED STATES PATENTS

| | | |
|---|---|---|
| 2,256,878 | Black | Sept. 23, 1941 |
| 2,325,090 | Alison | July 27, 1943 |
| 2,689,458 | Weymann | Sept. 21, 1954 |
| 2,878,642 | Maurice et al. | Mar. 24, 1959 |
| 2,924,942 | Sinclair | Feb. 16, 1960 |